United States Patent [19]
Zovath et al.

[11] Patent Number: 5,939,638
[45] Date of Patent: Aug. 17, 1999

[54] PRESSURE SENSOR WITH PROTECTIVE INTERNAL WALL

[76] Inventors: Peter J. Zovath, 3902 Crow Valley Dr., Missouri City; William L. Rose, 87 The Oval, Sugarland, both of Tex. 77459

[21] Appl. No.: 08/904,534

[22] Filed: Aug. 1, 1997

[51] Int. Cl.[6] .................................................. G01L 9/00
[52] U.S. Cl. .............................. 73/723; 73/706; 73/728; 200/83 L; 200/83 R
[58] Field of Search ............................. 73/714, 723, 728, 73/706; 340/626; 137/554, 557; 200/83 R, 83 F, 83 J, 83 L, 83 Q

[56] References Cited

U.S. PATENT DOCUMENTS 5,703,552  12/1997  Buffet et al. ...................... 200/83 R X Primary Examiner—Joseph L. Felber
Attorney, Agent, or Firm—Bill B. Berryhill

[57] ABSTRACT

A remote pressure or vacuum sensing device including a housing having first and second chambers separated by an internal wall, the first chamber being in fluid communication with a pressurized or vacuum environment to be monitored. An activator assembly is carried within the first chamber for axial movement therein between a terminal position and other positions in response to fluid communication of pressure or vacuum conditions of the monitored environment to a portion of said activator assembly. An activatable assembly is carried within the said second chamber for activation upon movement of the activator assembly from its terminal portion to other positions to provide signals for indicating pressure changes in the monitored environment.

34 Claims, 14 Drawing Sheets

PRESSURE SENSOR WITH PROTECTIVE INTERNAL WALL

BACKGROUND OF THE INVENTION

1. Field of the Invention

The present invention pertains to remote pressure or vacuum sensing devices. More specifically, the present invention pertains to a pressure or vacuum sensing device capable of remote sensing of the positioning and operation of relief valves or other pressure and vacuum sensing devices.

2. Description of the Prior Art

Most pressure or vacuum vessels and systems are provided with some type of pressure relief device which, when pressure or vacuum within the vessel or system reaches an unsafe or undesirable level, opens to relieve or ameliorate the undesired pressure or vacuum condition. This prevents damage to the vessel or other components of a pressurized or vacuum system and in many cases may prevent life threatening, environmental or economical catastrophes.

Most relief devices are in the form of a spring loaded relief valve which opens to relieve an unwanted pressure or vacuum or a rupture disk which ruptures to relieve such a condition. Both types of relief devices have limitations and are subject to malfunctions. Spring operated relief valves are typically set and tested at a test facility prior to installation on a vessel or in a pressurized system. The valve is set to operate or relieve at a particular pressure level. Although such a relief valve may operate as intended when first installed, it may, over a period of time, cease to function as intended due to corrosion, erosion, vibration, temperature, fatigue or any number of other mechanical or environmental conditions. Furthermore, relief valves frequently open and close within mili-seconds. Opening and closing may not be uniform and many times the valve may reseat differently causing the valve to not function as intended in subsequent operation. Relief valves are also noisy, causing potential interference with other devices. In addition, it is desirable to know exactly when and how long a relief valve opens and/or closes as well as the distance traveled by the valve closure member when opened. Such operation is not easily monitored with the typical relief valve.

Rupture type relief devices also have certain disadvantages. For example, when pressure or vacuum conditions in a vessel or system reach a pre-determined level, the rupture disk or element of a rupture type relief device ruptures to relieve the pressure or vacuum condition. When this occurs, it is necessary to replace the ruptured element after the pressure or vacuum problem is corrected. In addition, rupture devices are also subject to improper functioning due to vibration, corrosion, erosion, fatigue, etc. Rupture disks require at least a specified pressure or vacuum for operation. Therefore, they are not suitable for very low pressure or vacuum conditions. Furthermore, rupture disks, of fixed form, are pre-set and cannot be adjusted for different settings.

In more recent years, particularly due to heightened environmental and safety concerns, various devices have been designed for monitoring the operation of various relief devices. For example, U.S. Pat. No. 4,342,988 discloses a system for detecting actual or impending failure of the rupture disk of a rupture type relief device. In this system, strain gauges and wires are attached to the rupture disk. When the disk ruptures the wires are severed, closing an electronic circuit and providing a remote signal to indicate rupture. One of the problems of such a system is the exposure of the relieved fluids to an electrical current which may cause an explosion. If this type of device is utilized to monitor operation of a spring type relief valve, the valve must be taken out of service to remove the device when ruptured. This results in down time, shutting down operation of the protected process while the device is sent to a shop for disk, wire and strain gauge replacement and testing.

In more recent years, a number of other pressure responsive control devices or switches have been developed which utilize diaphragm or bellow operated actuators. Examples of such may be seen in U.S. Pat. Nos. 5,198,632; 5,216,213; 5,281,782; 5,331,126; etc. In most of these designs, the diaphragm of the actuator is disposed in a cavity, dividing the cavity into a pair of chambers, one chamber being exposed to the pressurized environment and the other chamber housing or being exposed to the electrical switching apparatus. Thus, if the diaphragm ruptures, it exposes the switching circuitry to the fluids of the pressurized environment, resulting in a potentially hazardous and part damaging environment. In addition, most of these systems incorporate many complex parts, resulting in higher cost and greater susceptibility to malfunctioning. Most of them are limited in movement and do not have the ability to incorporate optic or radio frequency type sensing devices or sensing devices which require smooth elongated linear travel. Most of them are not easily and precisely adjustable.

It is therefore clear, that most of the pressure sensing devices, particularly those which utilize rupture disks, diaphragms, etc. are not totally acceptable for monitoring operation of pressure relief valves and the like. Safer, more reliable, easier to use and less expensive monitoring devices are needed.

SUMMARY OF THE PRESENT INVENTION

The present invention provides a remote pressure sensing device which eliminates many of the problems associated with prior art devices. It provides a housing having first and second chambers separated by an internal wall. The first chamber carries an activator assembly and is in fluid communication with the pressure/vacuum relief device or the pressurized or vacuum environment to be monitored. The second chamber carries an activatable assembly. The activator assembly carried within the first chamber includes a diaphragm member one side of which is in fluid communication with the monitored pressurized environment. The opposite side of the diaphragm is isolated from the pressurized environment so that even if the diaphragm is ruptured, the pressurized environment is isolated from the second chamber in which the activatable assembly is carried. The diaphragm member is moveable and responsive to pressure in the monitored pressure environment to move the activator assembly between a terminal position and other positions in response to pressure from the monitored pressurized environment. The activatable assembly is activatable upon movement of the activator assembly from the terminal position to other positions to provide signals for indicating pressure changes in the monitored pressurized environment.

One of the major objects and advantages of the pressure/vacuum monitoring device of the present invention is the isolation of the diaphragm operated activator in a first chamber separated by a wall from the second chamber in which the activatable assembly and electrical components therefor are disposed. This allows the diaphragm to be more accurately sized and designed for specific pressure or vacuum ranges. It allows the use of a single diaphragm of increased flexibility for a greater range of pressures than permitted by prior art devices which are typically metal and which have to rely on the diaphragm alone for pressure isolation. Because it does not have to act as a sole pressure retaining barrier, the diaphragm of the present invention can be made of metal or more flexible non-metallic materials of greater versatility and sensitivity and capable of greater over travel. Thus, the pressurized or vacuum environment being monitored is totally isolated from the activatable assembly and electrical components thereof even in a case when the diaphragm is ruptured. This allows explosion proof design in which low or high voltage DC or AC electrical current may be used. The separate chambers allow the pressure sensing components and the electrical signal components to be completely separated.

The pressure/vacuum sensing device of the present invention is very compact in design and is suitable for large or small orifice openings from the pressurized or vacuum environment being monitored. The number of parts and assembly thereof is considerably less complex, more reliable and less costly than most other diaphragm operated pressure sensing devices. The pressure sensing activator assembly of the present invention is provided with a switch activator which, in the preferred embodiment, is a powerful permanent magnet. This permits use of a different number of switching devices in the activatable assembly located in the second chamber. The unique activation in combination with the proper activatable device, provides excellent sensing and multiple operational characteristics of the relief valve or monitored pressurized or vacuum environment with which the device is used.

The pressure sensing device of the present invention is capable of resetting itself without having to remove the relief valve or other element being monitored and can, itself, be replaced without removal of the relief valve. While the pressure sensing device is especially designed for electrical signal means, optic, radio frequency or other non-mechanical signal means may also be provided therewith.

Many other objects and advantages of the invention will be apparent from reading the following description read in conjunction with the accompanying drawings in which preferred embodiments of the invention are shown.

DESCRIPTION OF PREFERRED EMBODIMENTS

Figure 1:
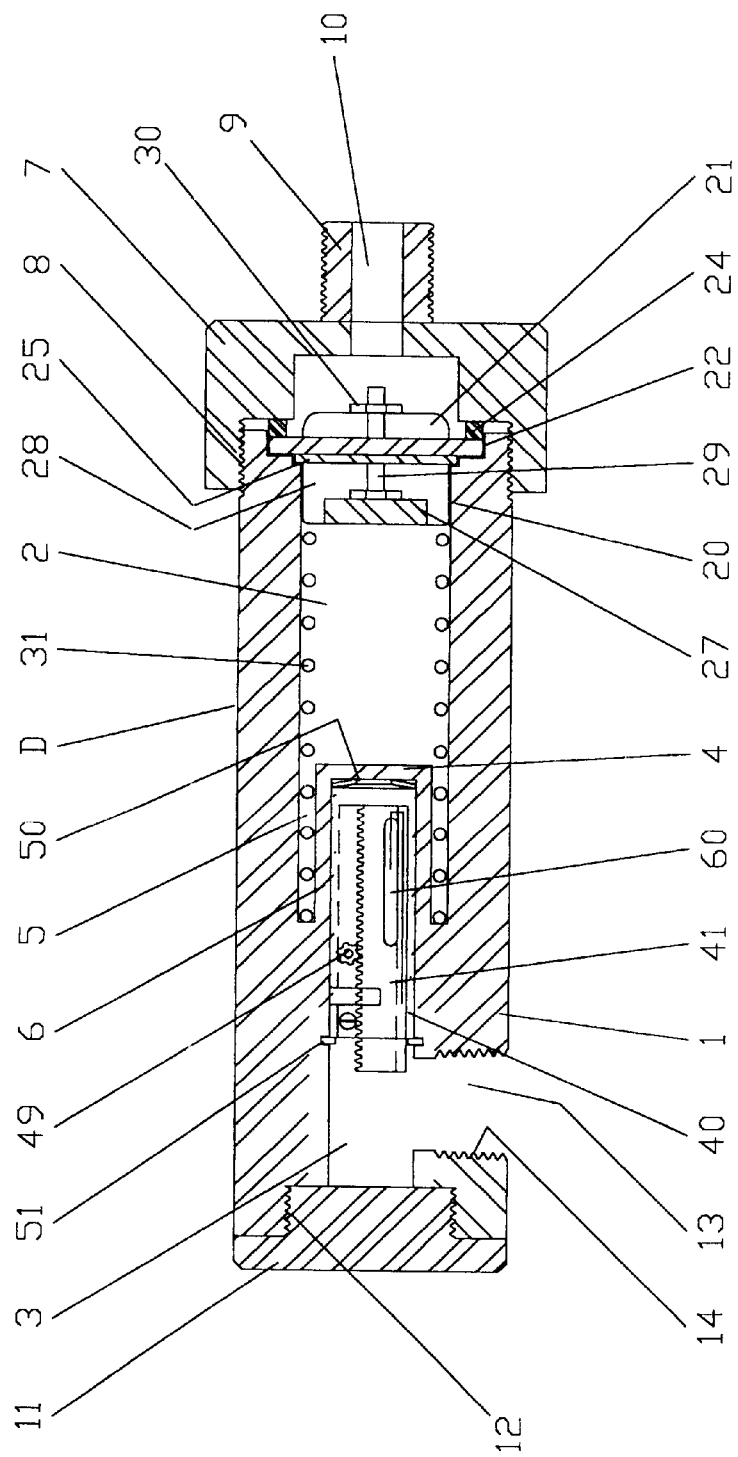
FIG. 1 is a longitudinal view, in section, of a remote pressure sensing device according to a preferred embodiment of the invention.
Figure 2:
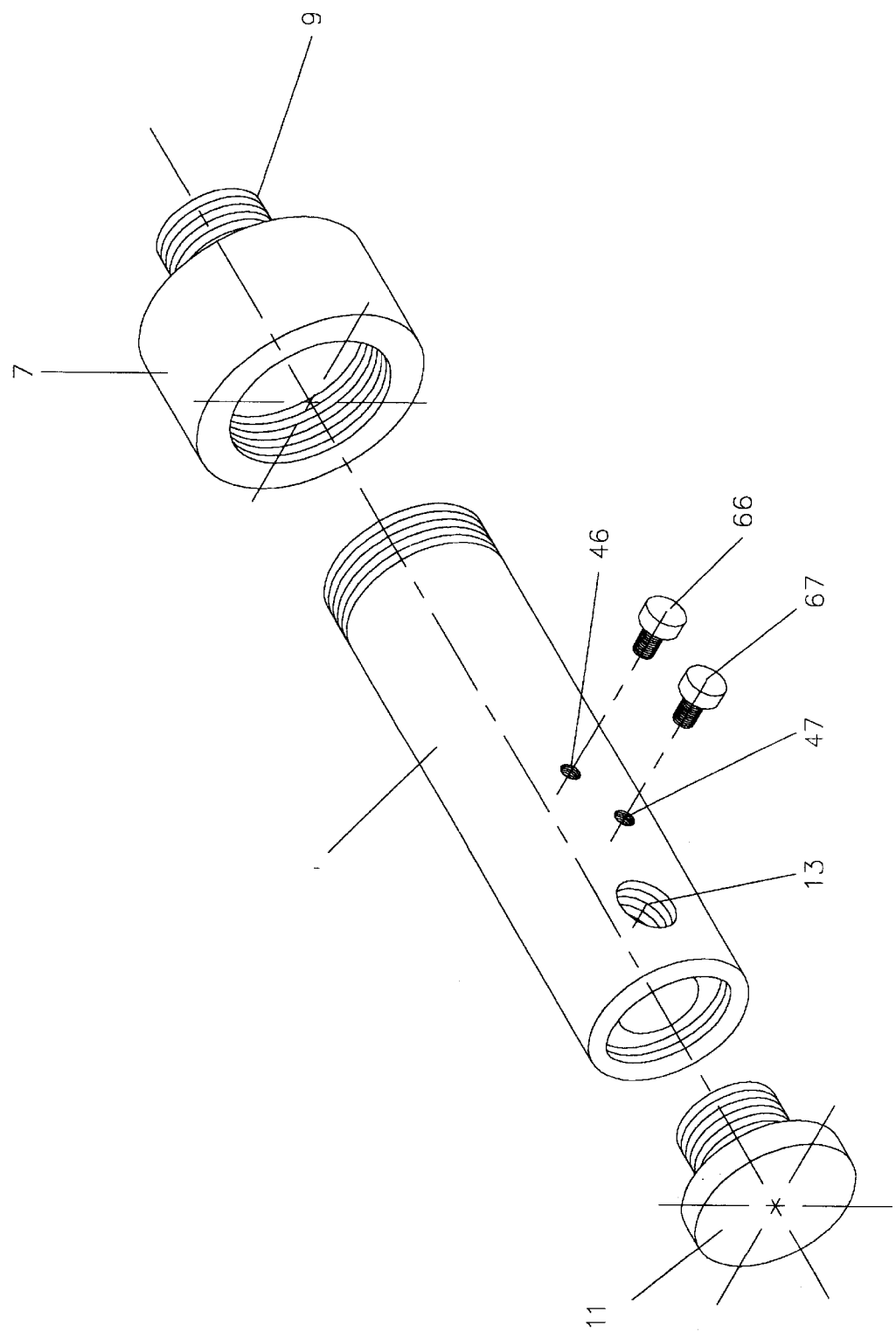
FIG. 2 is an exploded isometric view of the outside parts of the remote sensing device of FIG. 1, according to a preferred embodiment of the invention.
Figure 3:
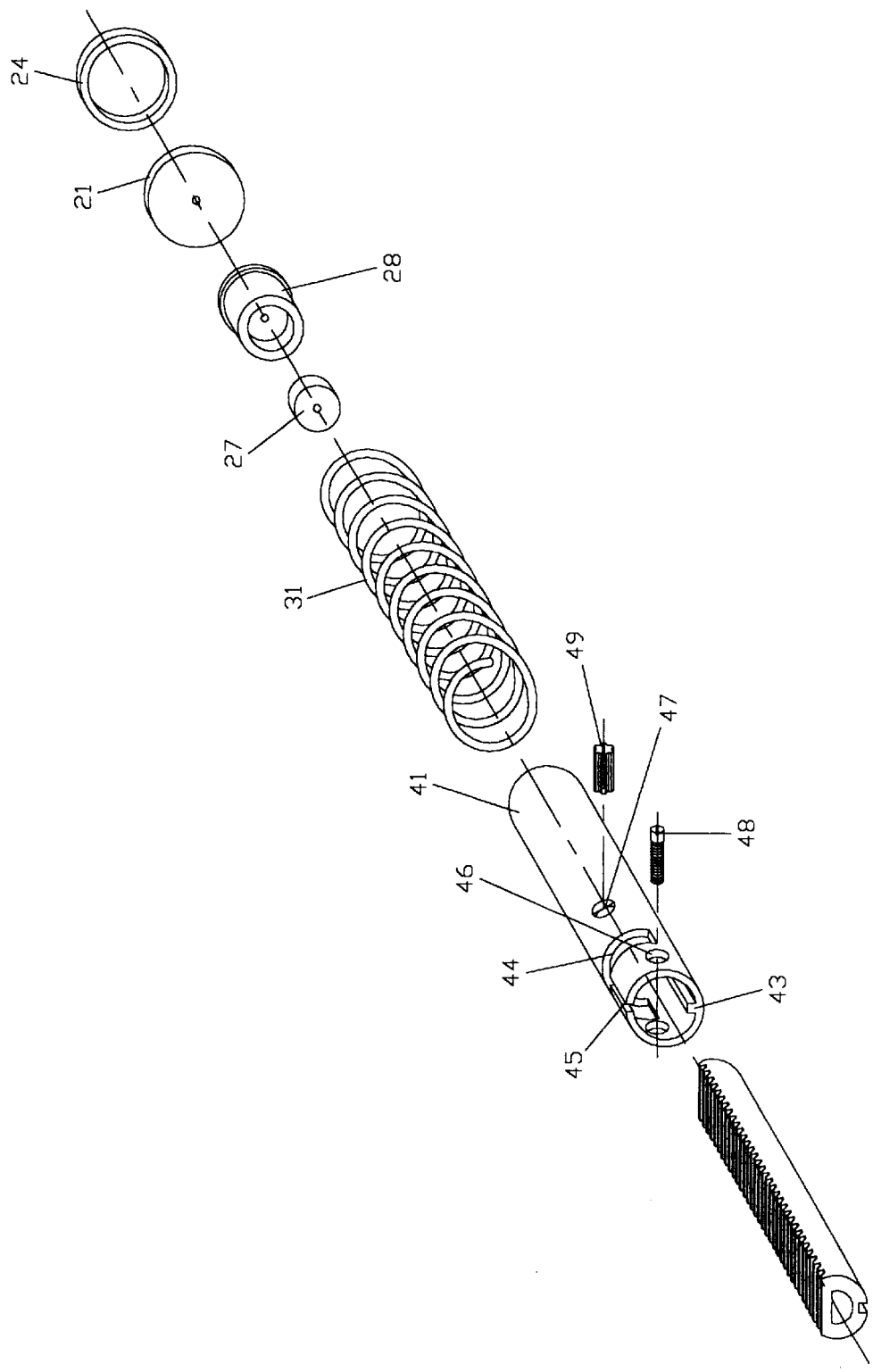
FIG. 3 is an exploded isometric view of the inside parts of the remote sensing device of FIG. 1, according to a preferred embodiment of the invention.
Figure 4:
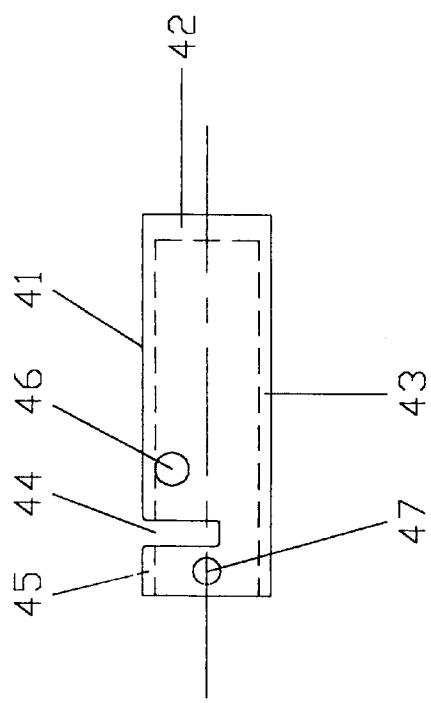
FIG. 4 is a longitudinal view of a gear rail housing, which is a component of the remote pressure sensing device of the present invention, according to a preferred embodiment thereof.
Figure 5:
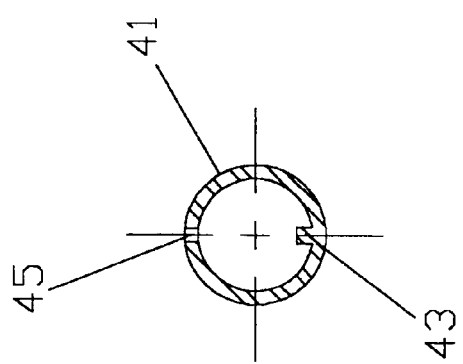
FIG. 5 is a cross-sectional view of the gear rail housing of FIG. 4.
Figure 6:
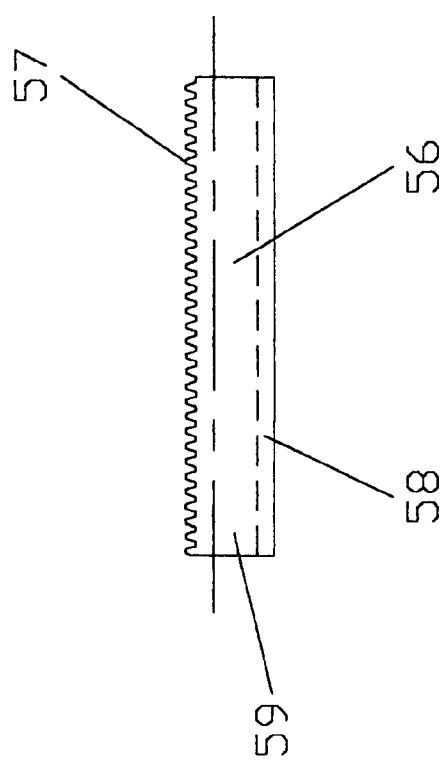
FIG. 6 is a longitudinal view of a gear rail which is one of the components of the pressure sensing device of the present invention, according to a preferred embodiment thereof.
Figure 7:
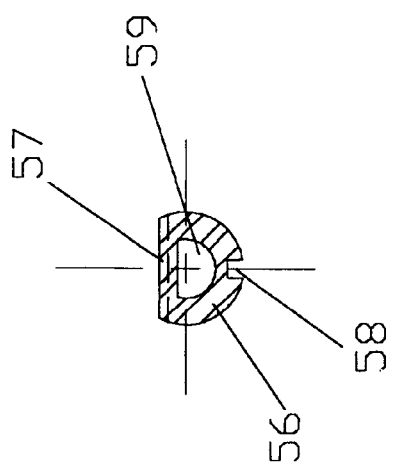
FIG. 7 is a cross-sectional view of the gear rail of FIG. 6.
Figure 8:
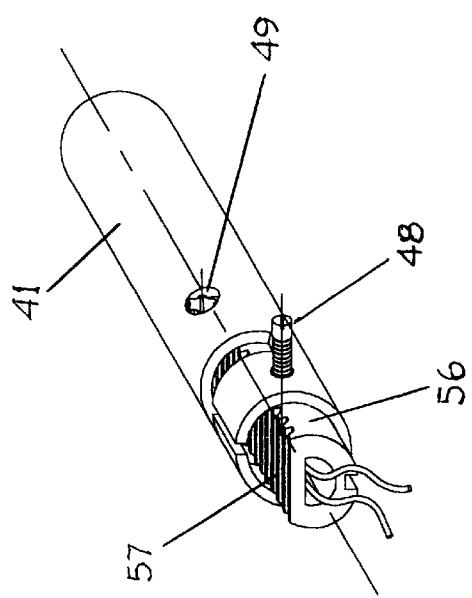
FIG. 8 is an isometric view of the gear rail housing and gear rail of FIGS. 4–7 as they would be assembled for use in the pressure sensing device of the present invention.

Referring first to FIGS. 1, 2 and 3, there is shown a remote pressure sensing device D which comprises a cylindrical (or any other cross-section) housing 1 having first and second chambers 2, 3 separated by an internal wall 4. The chambers 2 and 3 may be formed in a casting or by central boring of a piece of cylindrical stock from which the housing 1 is made. In the embodiment of FIG. 1, the first chamber 2 is formed at one end thereof with an annular space 5. In this case, the cylindrical wall 6 and the circular wall 4 form the internal walls which separate the first and second chambers 2, 3. The end of the first chamber 2 is closed by a cylindrical closure member 7 by threaded engagement 8 between external threads on the end of the housing 1 and internal threads within the first closure member 7. The interior of the closure member 7 may be considered a portion of the first chamber 2. The first closure member 7 is provided with an externally threaded connector 9. Central passages through the connector 9 and closure member 7 provide an inlet 10 through which the first chamber 2 may be placed in fluid communication with a pressurized or vacuum environment to be monitored. This design permits use on very small orifice openings without sacrificing reliable, safe operation.

A second closure member 11 is removably engageable with the housing 1 in a threaded connection 12 provided by internal threads in the housing 1 and external threads on the closure member 11. The second closure member 11 closes the end of the second chamber 3. In some cases the closure member 11 might be provided with a light transmittable aperture (not shown) of some type through which light generated within the second chamber 2 might be transmitted. A side opening 13 may also be provided into the second chamber 3. The side opening 13 may be provided with threads 14 for threaded connection with electrical conduits, fiber optics or the like.

Carried within the first chamber 2 for movement between a terminal position and other positions in response to pressure transmitted to inlet 10 from the pressured or vacuum environment to be monitored is an activator assembly 20. Carried within the second chamber 3 is an activatable assembly 40. The activatable assembly 40 is activated upon movement of the activator assembly 20 from its terminal position to other positions to provide signals for indicating pressure changes in the monitored environment. The mutual operation of the activator and activatable assemblies 20, 40 will be more fully understood hereafter. Although the description is of a device for sensing positive pressure, it can easily be adapted for vacuum or negative pressure.

The activator assembly 20 comprises a diaphragm member 21 the periphery 22 of which engages an annular surface provided in the counterbored end of housing 1. The diaphragm 21 can be made from elastomer and/or metal without concern for affecting operation of the activatable assembly 40 since it is separated from the second or switch chamber 3. The diaphragm member 21 is held in sealing engagement with the housing 1 by washer 24. Thus, one side of the activator assembly 20 and the diaphragm member 21 are in fluid communication with the environment being monitored through the inlet 10. The opposite side of the activator assembly 20 and diaphragm member 21 and the portion of the first chamber 2 to the opposite side of the diaphragm 21 are isolated from the monitored environment. The diaphragm member 21 and the activator assembly 20 of which it is a part are moveable in response to pressure changes in the monitored environment to move the activator assembly 20 from a first terminal position, as illustrated in FIG. 1, to other positions to the left thereof, as viewed in FIG. 1. An annular shoulder 25 created by another counterbored portion of the housing 1 limits travel of the activator assembly 20.

The activator assembly 20 also comprises an activator 27 carried by an activator body 28. The activator body 28 is connected to the diaphragm 21 and moves therewith in response to pressure exposed to the opposite side of the diaphragm 21. The diaphragm 21 and body 28 are connected by a threaded stem 29 and corresponding lock nut 30 which allows limited axial adjustment between these two members. In fact, the adjustment can be made, if desired, through the inlet 10 without disturbing other components of the device. If desired, a compressed, helicaly wound spring 31 may be placed in the first chamber 2, one end against the activator body 28 and the other end within the annular space 5, biasing the activator assembly 20 towards its first terminal position.

The activator 27, in the preferred embodiment of FIG. 1, is a permanent magnet. The magnet is selected of a size, strength and material appropriate for the particular application. Many powerful magnets of neodymium rare earth or alnico are available for this purpose. Thus, the magnetic switch activator 27 is attached to the diaphragm 21 and is moveable therewith, within chamber 2, to positions nearer or farther from the activatable assembly 40 carried within the second chamber 3 for activating the activatable assembly 40 to provide signals for indicating pressure changes in the monitored environment in a manner which will be more fully understood hereafter.

Referring now, in addition to FIGS. 1, 2 and 3, FIGS. 4–8, the activatable assembly 40 will be described in greater detail. The activatable assembly 40 in the exemplary embodiment includes a switch and will be referred to as a switch assembly 40. However, the invention is not limited to switch devices and the activatable assembly 40 could be a solid state device, a radio frequency transmitter, a fiber optic device or any other device which could be activated by the activator assembly 20. The term "switch" or "switching device" as used herein is intended to include "on/off" switches, linear output devices such as rheostats, transmitters, solid state logic circuits, etc. The switch assembly 40 comprises a tubular housing 41 which is fixedly mounted within the second chamber 3 in coaxial alignment with a central axis of the first and second chambers 2, 3. The tubular housing 41 is preferably closed at one end with an end wall 42 and open at the other end. Extending longitudinally along the inner wall of the housing 41 is a rail or key 43. Near the open end of the housing 41, opposite the key rail 43, a section of the housing wall is cut away to leave an arcuate slot 44. A longitudinal slot 45 is cut through the wall directly opposite of the key rail 43 allowing the open end of the housing 41 to be contracted or reduced in diameter if a sufficient radial force were applied thereto. Transverse holes 46 and 47 are provided on opposite sides of the arcuate slot 44. The axes of holes 46 and 47 are perpendicular to the central axis of the tubular housing 41. These holes 46, 47 have corresponding holes on the opposite side of the tubular member 41. At least the hole 47 or the corresponding hole on the opposite side of the tubular member 41 is threaded for threaded engagement with a lock screw 48. The hole 47 and its corresponding hole on the opposite side of the tubular member is adapted to rotatingly receive opposite ends of a gear member 49. The tubular housing 41 is removably mounted within the second chamber 3 between a bellville spring 50 and an E-clip 51 which engages an encircling groove cut in the wall of the second chamber 3. (See FIG. 1.) It is of course understood that removal of the E-clip 51 would allow removal of the housing 41.

Slidingly carried within the tubular housing 41 for adjustable positioning between positions closer to and farther away from the magnetic activator 27 is a switch carrying member 55. The switch carrying member 55, as best seen in FIGS. 1, 3, 6 and 7, comprises a semi-cylindrical body 56 and a gear rack 57 the teeth of which are substantially perpendicular to the axis of tubular housing 41. An elongated longitudinal slot or keyway or railway 58 is cut along the entire length of the lower body 56 of the switch carrying member 55. This slot or keyway 58 engages the key or rail 43 of the housing 41 in which the switch carrying member 55 is carried. Thus, the switch carrying member 55 is permitted to slide longitudinally within the housing 41 but may not rotate relative thereto.

The switch carrying member 55 may be provided with an elongated cavity 59 in which a switching device may be disposed. The switching device may be any one of several types of switches. In FIG. 1 it is illustrated as a magnetic reed switch 60. This type of switch could be activated by the proximity of a magnet such as the magnetic switch activator 27 of FIG. 1. Movement of the magnetic activator 27 away from the switch 60 would cause the switch to open. The switch 60 could be any of a number of types of switches. For example, it could be a switching device which comprises a terminal strip having a plurality of terminals which, in cooperation with corresponding electrical components, provide discreet signals to indicate specific positions or pressure conditions of the corresponding member. This type of switch is sometimes referred to as a "Hall effect" switch. Another example of another type of switching device would be one utilizing one or more light emitting diodes (LED). In any of these switches such switches would normally form part of a circuit for transmitting an electrical or optical signal. Thus, they might be connected in circuitry by wiring or, in the case of optics, optic fibers. The wiring or optic fibers could extend from the switch in the elongated cavity 56 through the outlet 13. (See FIGS. 1 and 2.) A conduit might be connected at the outlet 13 by the threads 14 and the electrical wiring or optic fibers would extend to some point for connection with a visual or audible indicator of some type (not shown).

At this point, operation of the remote pressure sensing device D, as shown in the embodiment of FIGS. 1–8 will be described. The sensing device D is assembled, as shown, with activator assembly 20 and the activatable switch assembly 40 properly installed. The size, material and power of the magnetic switch activator 27 and the switch of the switch assembly 40 are selected for proper cooperative operation. The position of the switch carrying member 55 is adjusted so that the switch carried thereby, e.g. the reed switch 60, is properly spaced from the magnetic switch activator 27. Adjustment may be accomplished by first placing a screw driver through one of the housing holes 47 for engagement with the lock screw 48 and loosening of the lock screw 48 so as to allow axial movement of the switch carrying member 55 within the housing 41. Then a screw driver is placed through the other housing aperture 46 for engagement with a screw driver slot on one end of gear 49. Rotation of the gear 49, which engages the rack 57 of the switch carrying member 55, causes the switch carrying member 55 to move closer to or farther away from the magnetic switch activating member 27, depending upon which way the gear 49 is rotated. After proper adjustment, the lock screw 48 is again tightened so that the surrounding tubular housing tightly grips the switch carrying member 55 preventing further movement thereof. Then the screw driver is removed and the housing apertures closed by plugs 66, 67.

The pressure sensing device D is attached by conduit (not shown in FIG. 1) which would engage the connection 9 so that the inlet 10 and the portion of the first chamber to the right of the activator assembly 20 (as viewed in FIG. 1) is in fluid communication with a pressurized environment being monitored. If pressure in the pressurized environment reaches a certain level, it is communicated to the diaphragm 21 of the activator assembly 20. The diaphragm 21 then moves between its initial terminal position and some other position, in response to the pressure change in the monitored environment. As this occurs, the magnetic switch activator 27 moves to positions nearer to the switch carried by the switch assembly 40. At a predetermined point, the magnetic force produced by the magnetic switch activator 27 activates the switch carried by the switch assembly 40. Activation of the switch provides a signal through an electrical circuit to some remote point where a visual or audible signal is provided indicating pressure changes in the pressurized environment. When the pressure is reduced by a predetermined amount, the magnetic switch activator 27 returns toward the terminal position, due to the return forces of the diaphragm 21 and, in the embodiment of FIG. 1, the biasing spring 31, so that the switch in the switch carrying assembly 40 is deactivated indicating such through interruption of the signal in the circuitry thereof. As previously stated, this device is easily adapted for monitoring vacuum environments.

The remote pressure sensing device D of the present invention is an explosion proof design. The electrical components are separated from the pressure activated components. Even if the diaphragm of the switch activation assembly ruptures, the pressure environment is still isolated from the electronics. This explosion proof design may be used in all areas and all atmospheres, simple applications such as pressurized house utilities or extremely difficult and hazardous areas such as refineries and chemical plants.

Figure 9:
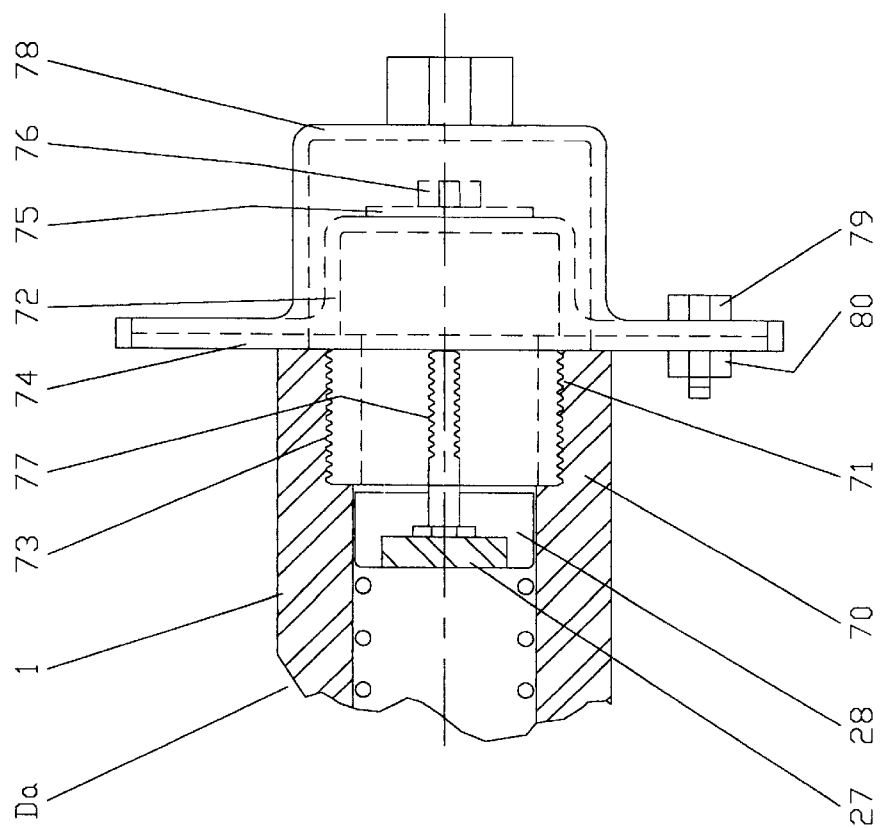
FIG. 9 is a partial longitudinal view, partially in section, of a modified version of the remote pressure sensing device of FIGS. 1–8.

There are a number of variations which can be made to the invention. For example, FIG. 9 illustrates a portion of a sensing device D$_a$ adapted for pressure or vacuum conditions which require an increase in surface area of the diaphragm. In other words, the sensing device D$_a$ may be modified to be more pressure or vacuum sensitive. In this embodiment, the activator assembly 70 is modified to provide a base member 71 for interposition between the magnetic activator body 28 and a larger diaphragm 72. The base 71 engages the housing 1 in a threaded connection 73 providing a flange of 74 of greater diameter. The greater diameter diaphragm 72 sealingly engages the flange 74 of the base member 71 and is held in place by washer 75 and the engagement of lock nut 76 with the threaded stem 77. A larger cap 78 replaces the closure member 7 of the device D of FIG. 1 and the base member 71, diaphragm 72 and cap 78 are all sealingly connected by bolts and nuts 79, 80.

Figure 10:
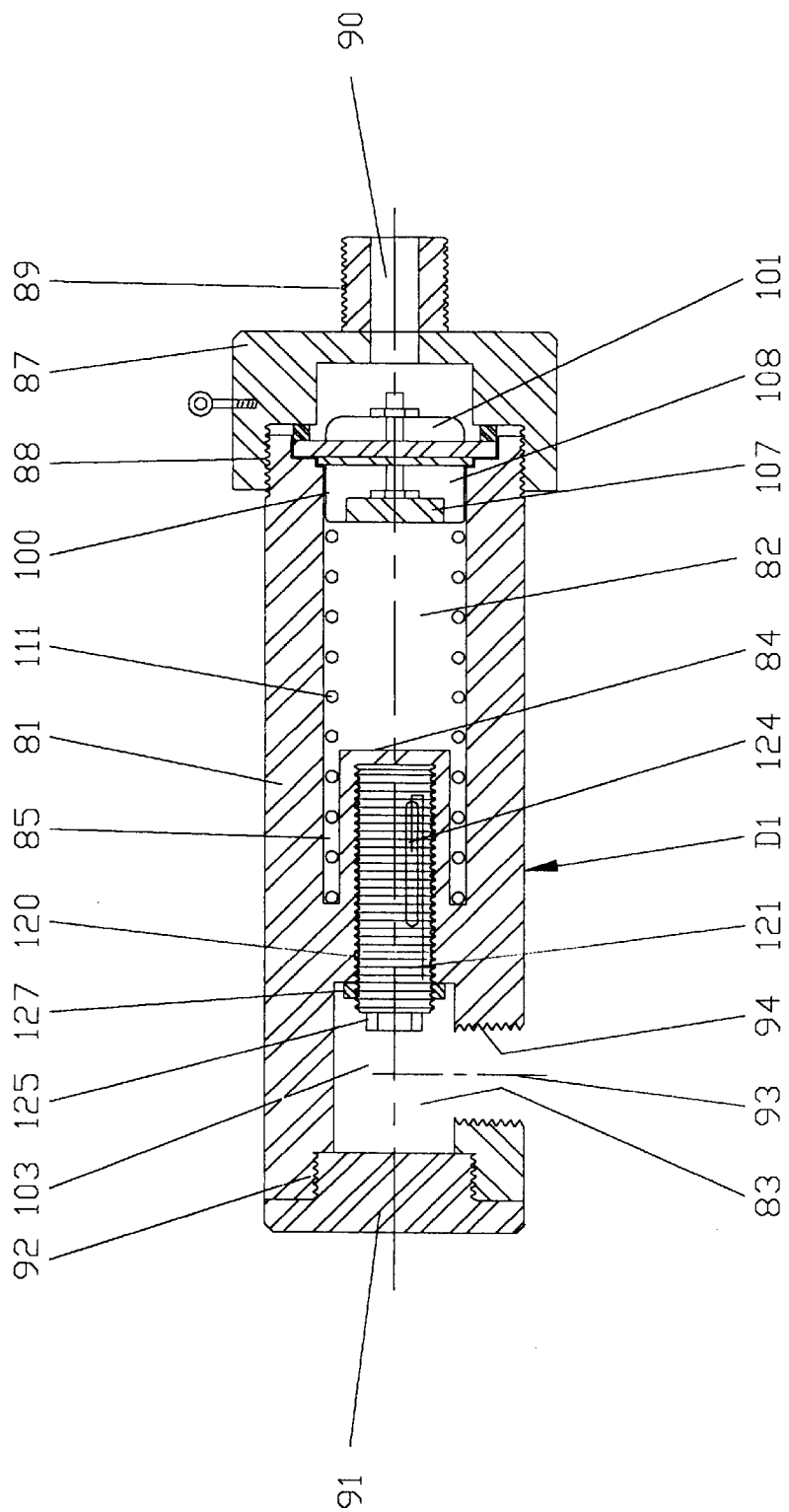
FIG. 10 is a longitudinal view, in section, of a pressure sensing device according to an alternate embodiment of the invention.

Referring now to FIG. 10, an alternate embodiment D1 of the invention is shown which in many respects is similar to the embodiment described with reference to FIGS. 1–8. It comprises a cylindrical housing 81 having first and second chambers 82, 83 separated by an internal wall 84. The chambers 82 and 83 are formed by central boring of a piece of cylindrical stock from which the housing 81 is made. Like the embodiment of FIGS. 1–8, the first chamber 82 is formed at one end thereof with an annular space 85. The end of the first chamber 82 is closed by cylindrical closure member 87 by a threaded engagement 88 between external threads on the end of the housing 81 and internal threads within the first closure member 87. The interior of the closure member 87 is considered a portion of the first chamber 82. The first closure member 87 is provided with an externally threaded connector 89 and central passages through the connector 89 and closure member 87 provide an inlet 90 through which the first chamber 82 is placed in fluid communication with a pressurized (or vacuum) environment to be monitored.

Like the embodiment of FIGS. 1–8, a second closure member 91 is removably engageable with the housing 81 by a threaded connection 92 provided by internal threads in the housing 81 and external threads on the closure member 91. The second closure member 91 closes the end of the second chamber 83. Side opening 93 may be provided with threads 94 for threaded connection with electrical conduits or the like.

The first chamber 82 carries an activator assembly 100 which moves between a terminal position and other positions in response to pressure transmitted to the inlet 90 from the pressurized environment to be monitored. Carried within the second chamber 83 is an activatable switch assembly 120. Like in the embodiment of FIGS. 1–8 the switch assembly 120 is activated upon movement of the activator assembly 100 from its terminal position to other positions to provide signals for pressure changes in the monitored pressurized environment. The activator assembly 100 is essentially the same as the activator assembly 20 of FIGS. 1–8. It comprises a diaphragm member 101, an activator 107 and activator body 108. A helicaly wound spring 111 may be disposed in the first chamber 82, biasing the activator assembly 100 toward its first terminal position. The activator 107 is preferably a permanent magnet.

The switch assembly 120 of the embodiment of FIG. 10 is somewhat different than the switch assembly 40 of FIGS. 1–8. Instead of the gear and gear rail arrangement of the embodiment of FIGS. 1–8, this embodiment is provided with a switch body 121 which is essentially cylindrical and provided with external threads. A cylindrical portion of the second cavity 103 is drilled and tapped providing threads for threaded engagement with the external threads of switch body 121. The switch body 121 is actually the switch carrying member and may be provided with an elongated cavity in which a switching device such as the magnetic reed switch 124 may be carried. By rotating the switch carrying body 121, the switch 124 can be moved to positions closer to or farther away from the activator 107. Rotation of the switch body 121 may be accomplished by removing the closure member 91 and engaging tool extension 125 with a wrench or screwdriver for which the tool extension 125 has been designed. Once the switch carrying body 121 and the switch 124 carried thereby is properly positioned, they may be locked in placed with a lock nut 127.

Operation of the remote pressure sensing device D1 is essentially the same as the sensing device D of FIGS. 1–8. If pressure in the monitored environment reaches a certain level, it is communicated to the diaphragm 101 of the activator assembly 100. The diaphragm then moves between its initial terminal position and some other position, in response to the pressure change in a monitored environment. As this occurs, the activator 107 moves to positions nearer to the switch carried by the switch 124 assembly 120. At a pre-determined point, the magnetic force produced by the magnetic activator 107 activates the switch 124 carried by the switch assembly 120. Activation of the switch 124 provides a signal through an electrical circuit to some remote point where visual and/or audible signals are provided, indicating pressure changes in the pressurized environment. When the pressure is reduced by a predetermined amount, the magnetic activator 107 returns toward the terminal position so that the switch 124 in the switch carrying assembly 120 is deactivated indicating such through interruption of the signal and the circuitry thereof.

Figure 11:
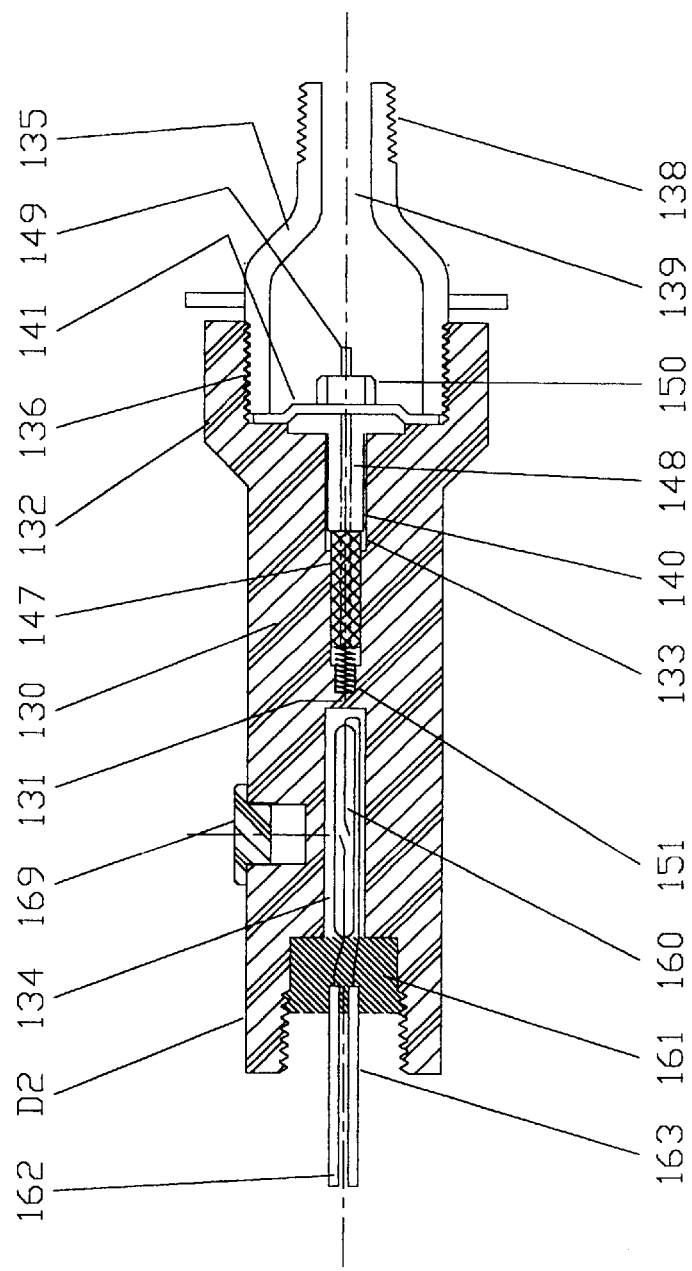
FIG. 11 is a longitudinal view, in section, of a pressure sensing device, according to another alternate embodiment of the invention.

FIG. 11 illustrates another embodiment of the invention of a unitized design. This embodiment D2 also comprises a cylindrical housing 130 having a larger diameter portion 132 at one end thereof. The housing 130 is provided with first and second chambers 133, 134 separated by a wall 131. The end of the first chamber 133 is essentially closed by a nipple type closure 135 having external threads which engage at 136 internal threads provided on the interior of the enlarged body portion 132. The opposite end of the nipple member 135 is provided with external threads 138 and a central passage 139 through which the first chamber 133 may be placed in fluid communication with a pressurized environment to be monitored.

This embodiment also includes an activator assembly 140 which comprises a diaphragm member 141 the periphery of which engages an annular surface provided within the enlarged portion of the housing 132 and is held in sealing engagement therewith by the end of the nipple member 135. Thus, one side of the activator assembly 140 and the diaphragm member 141 are in fluid communication with the pressurized environment being monitored through the inlet 139. The opposite side of the activator assembly 140 and diaphragm member 141 and the portion of the first chamber 133 to the opposite side of the diaphragm 141 are isolated from the pressurized environment. Diaphragm member 141 and the activator assembly 140 of which it is a part are moveable in response to pressure changes in the monitored environment to move the activator assembly 140 from a first or terminal position to other positions to the left thereof, as viewed in FIG. 11.

The activator assembly 140 also comprises a switch activator 147 carried by an activator body 148 which is connected to the diaphragm 141 and moves therewith in response to pressure exposed to the opposite side of the diaphragm 141. The diaphragm 141 and body 148 are connected by a threaded stem 149 and corresponding locknut 150 which allows limited axial adjustment between these two members. A compressed, helicaly wound spring 151 may be placed in the first chamber 133, one end against the activator body 148 and the other end against the dividing wall 131, biasing the activator assembly 140 towards its first or terminal position. The activator 147 is preferably a permanent magnet.

In this embodiment, the switch, illustrated as a magnetic reed switch 160, is inserted into the cavity 134, properly positioned, and permanently epoxied into place by a potting compound 161. Electrical wires 162, 163 may be connected to the switch 160 so that the insulated portions thereof extend through the potting compound 161 for extension to some point for connection with visual or audible alarm indicators of some type (not shown).

Operation of the remote pressure sensing device of D2 of FIG. 11 is essentially the same as the previously described embodiments. If pressure in the pressurized environment reaches a certain level it is communicated to the diaphragm 141 of the activator assembly 140. The diaphragm 141 then moves between its initial terminal position and some other position, in response to the pressure change in the monitored environment. As this occurs, the magnetic activator 147 moves to positions nearer to the switch 160. At a predetermined point, the magnetic force produced by the magnetic activator 147 activates the switch 160 providing a signal in an electrical circuit to some remote point where visual or audible signals indicate the pressure changes in the pressurized environment. When the pressure is reduced by a predetermined amount, the magnetic activator 147 returns toward its terminal position, due to the return forces of the diaphragm 141 and the biasing spring 151, so that the switch 160 is deactivated indicating such through deactivation of the signal in the circuitry thereof.

If desired, the housing 130 (or the housing of previously described embodiments) may be drilled and tapped to provide a blind hole for receiving a plug 169. The plug 169 may be removed and a magnet (not shown) may be inserted into the hole to activate the switch 160. This provides a way of testing the device D2 in place and without having to operate the activator assembly 140.

Figure 12:
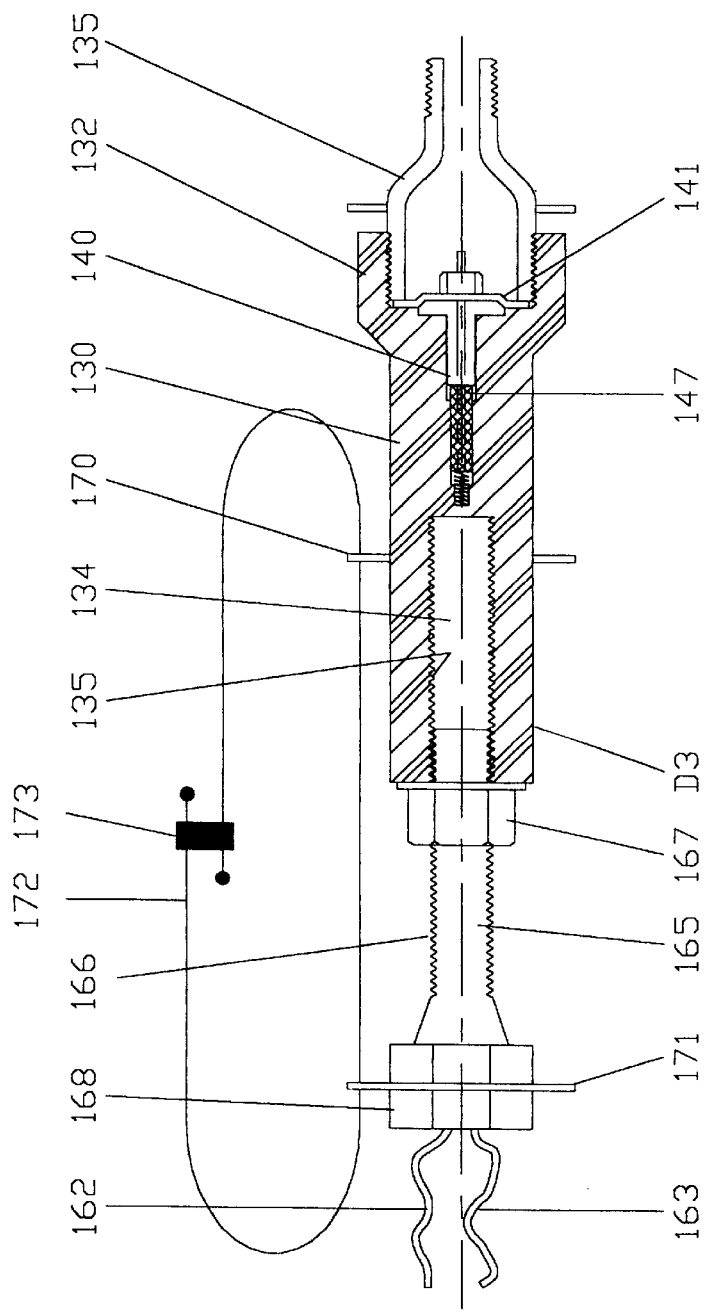
FIG. 12 is a longitudinal view, in section, of a pressure sensing device, according to still another alternate embodiment of the invention.

FIG. 12 illustrates still another alternate embodiment D3 of the invention which is very similar to the embodiment of FIG. 11. Identical parts are referenced by the same numbers as in FIG. 11. This includes the housing 130, the nipple 135, the activator assembly 140 (which includes the diaphragm member 141) and the activator 147.

The primary difference in the embodiment of D3 of FIG. 12 and the embodiment D2 of FIG. 11 is in the mounting of the switch. In this embodiment, the switch (not shown) is similar to the switch 160 of FIG. 11 but is carried in a switch body 165 which is removable from the housing 130. In this embodiment, the second chamber 134 of the housing 130 is provided with internal threads 135 for engagement with external threads 166 on the switch carrying body 165. Thus the switch carried thereby (not shown) can be properly positioned within the second chamber 134 by threaded engagement of the switch carrying body 165 with the threads 135 of the chamber 134. The switch carrying body 165 can be rotated so that the switch carried thereby (not shown) can be positioned closer to or farther away from the switch activator 147 of the activator assembly 140. When properly positioned, the locknut 167 may be utilized to secure the switch in its proper position. One end of the switch carrying body 165 may be provided with wrench flats 168 for rotation thereof. Wires 162, 163 connected to the switch (not shown) may be extended to some point for connection with visual or audible indicators. If desired the housing 130 and switch body 165 may be provided with radial flanges 170, 171, respectively, having one or more holes therein. A wire thread 172 may be threaded through holes in these flanges 170, 171 and locked in place with a lock type seal clamp 173 to prevent tampering with adjustment of the device D3.

Figure 13:
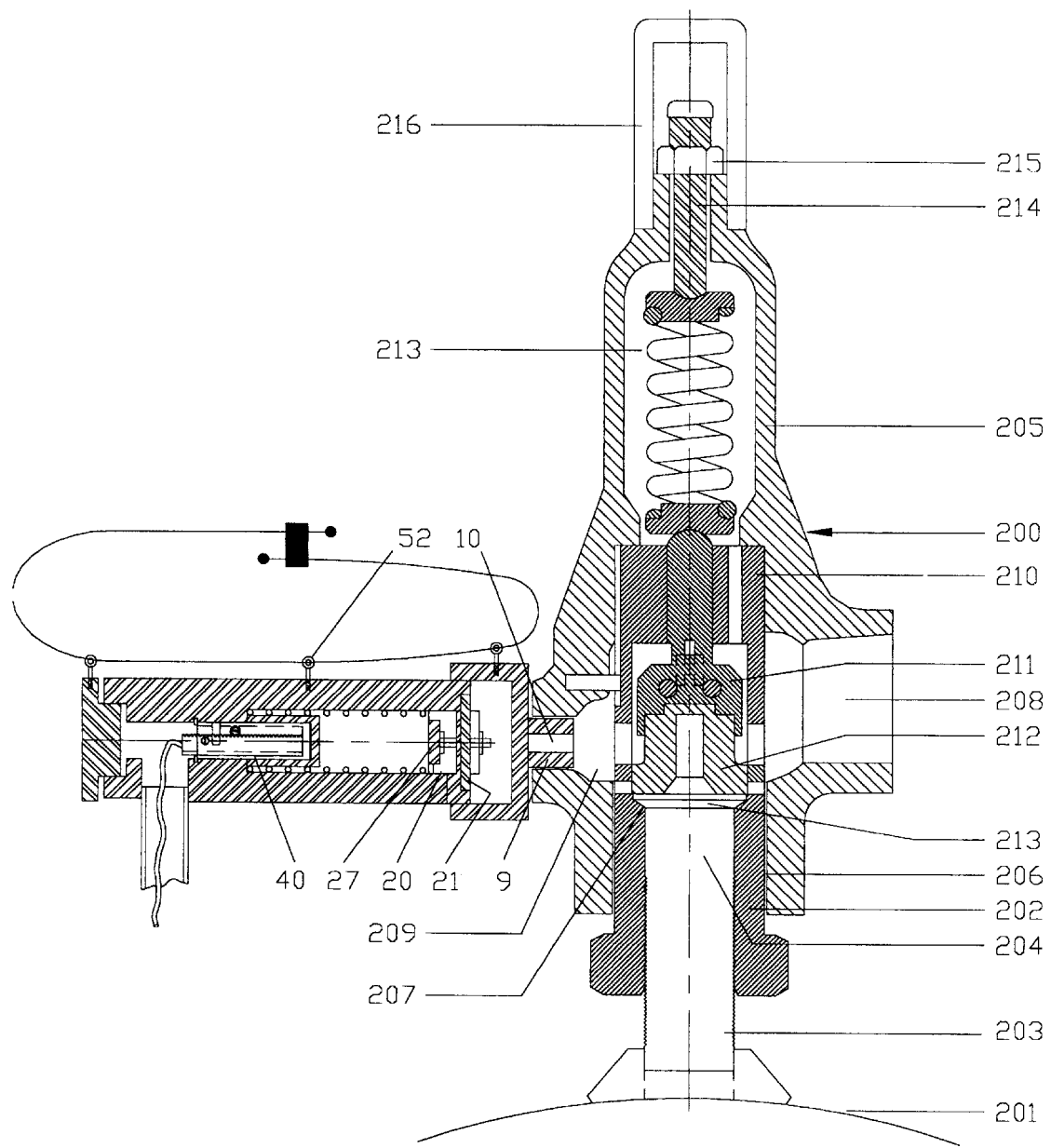
FIG. 13 is a longitudinal view of a relief valve of the prior art equipped with a pressure sensing device of the present invention, according to a preferred embodiment thereof.

Referring now to FIG. 13, a remote pressure sensing device D, such as the one previously described with reference to FIGS. 1–8, is shown for use with a safety valve 200 which is attached to a pressure vessel 201 to relieve excessive pressures that may occur in the vessel 201. The safety valve 200, like many valves of the prior art, comprises a valve body 202 having a threaded extension 203 for threaded connection with corresponding threads provided in the vessel 201. The body 202 is provided with an opening 204 which communicates with the interior of the vessel 201 and the pressurized environment therewithin. A valve bonnet 205 is connected with cooperating threads 206 to the body 202. The valve body 202 is provided with a valve seat 207.

The valve has an outlet port 208 and may be provided with a smaller side port 209 which may be threaded to receive the connector 9 of the pressure sensing device D. Carried within the valve bonnet 205 is a valve cage 210 and a valve assembly 211. The valve assembly 211 includes a closure member 212 having a seating surface 213 which when pressed against the valve seat 207 prevents flow of fluids from the vessel 201 through the valve inlet 204. However, the valve assembly 211 is mounted within the valve cage 210 for axial reciprocation therein so that if the valve assembly 211 is lifted from the seated position shown in FIG. 13, fluids may flow from the pressure vessel 201 through inlet 204 and the outlet 208.

Carried in the upper portion of the valve bonnet 205 is a spring assembly 213 the lower end of which bears against the upper end of the valve assembly 211, biasing the valve assembly 211 toward a closed position. The spring of the spring assembly 213 is selected of a size and materials so as to allow the valve assembly 211 to be unseated at a specified pressure level within the vessel 201. A threaded bolt 214 may be provided for fine adjustment of the spring assembly 213. After adjustment, the bolt 214 may be locked in place by locknut 215. A cap 216 prevents tampering with the spring assembly adjustment.

Assuming that pressure within the vessel 201 reaches a point at which the valve assembly 211 is lifted and the closure member 212 unseats from the valve seat 207, pressure within the vessel 201 is communicated with the pressure sensing device D through the inlet 10 and with a portion of the first chamber to the right of activator assembly 20. This pressure is communicated to the diaphragm 21 of the activator assembly. The diaphragm 21 then moves between its initial terminal position and some other position, in response to the pressure change in the monitored environment (vessel pressure). As this occurs the magnetic activator 27 moves to positions nearer to the switch carried by the activatable assembly 40. The magnetic force produced by the magnetic activator 27 activates the switch carried by the switch assembly 40. Activation of the switch provides a signal through an electrical circuit to some remote point where a visual or audible signal is provided indicating that pressure in the pressure vessel 201 has reached a point causing the relief valve 200 to open to relieve excessive pressure therein. When the pressure is reduced to a point which allows the relief valve closure assembly 211 to close, pressure is removed from the pressure sensing device D and the magnetic activator 27 returns toward its initial terminal position. The magnetic switch in the activatable assembly 40 is deactivated, indicating such through deactivation of the signal in the circuitry thereof. Thus, closing of the relief valve is immediately known. The pressure sensing device D therefore indicates exactly when the relief valve 200 opens and when it closes. Knowing the flow characteristics of the relief valve 200, the amount of pressurized fluids being discharged through the relief valve between opening and closing can be easily calculated.

Most pressure relief valves experience excessive vibration during pressure relief. Remote sensing devices of the prior art are not capable of properly indicating opening and closing of a relief valve without false signals. The present invention is not so impaired. Its magnet is strong enough to hold the switch in its proper position upon the valve opening and vibration will not prevent its resetting when the relief valve reseats.

Figure 14:
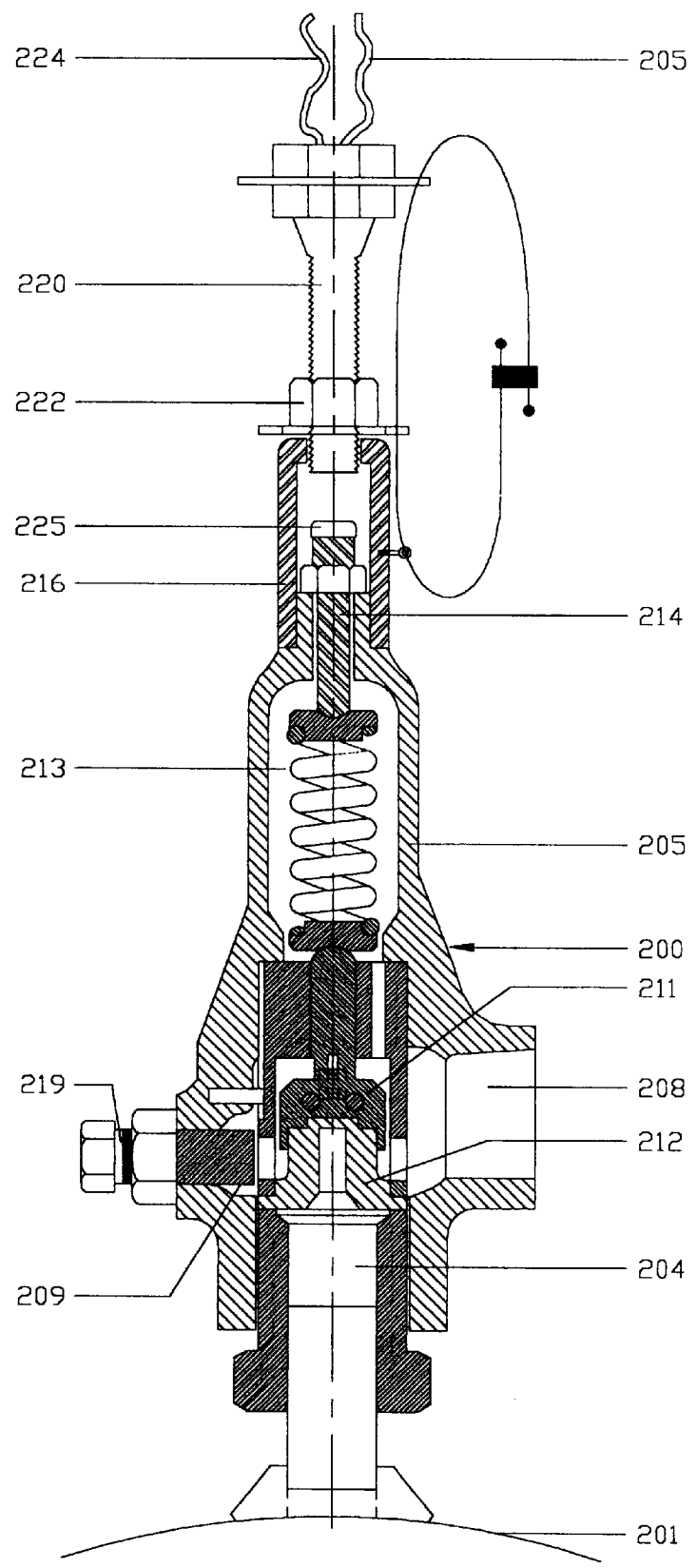
FIG. 14 is a longitudinal view of a pressure relief value of the prior art equipped with a pressure sensing device of the present invention, according to still another embodiment thereof.

FIG. 14 illustrate the relief valve 200 of FIG. 13 in which port 209 has been closed by a plug 219 and which is provided with a remote pressure sensing device which includes a switch body 220 similar to the switch body 165 of the pressure sensing device D3 shown in FIG. 12. The switch body 220 carries a switch (not shown) such as the magnetic switch 160 of FIG. 11 or an optical switch. The switch body 220 is provided with external threads for threaded engagement with corresponding internal threads in the hole at the upper end of the valve cap 216. The switch carrying body 220 may be rotated so that the switch carried thereby (not shown) can be axially positioned as desired. When properly positioned, the locknut 222 secures the position. Wires 223, 224 connected to the switch (not shown) may be extended to some point for remote connection with visual or audible indicators.

In this version, the upper end of the valve stem 214 may be provided with a magnetic or optical switch activator 225 which when moved to a predetermined position toward the switch (not shown) carried in the switch body 220, activates the switch, closing an electrical or optical circuit and producing an audible or visual alarm. Thus, if the pressure within the vessel 201 reaches a sufficient point, the closure member 212 is unseated and the valve assembly 211 moves the valve stem 214 axially, causing activation of the switch (not shown) in the switch carrying body 220. This indicates, as with the pressure sensing device D of FIG. 13, opening of the relief valve 200 and closing thereof when the pressure decreases to the point allowing the valve assembly 211 to return to its seated position. As in the embodiment of FIG. 13, the time of opening and closing of the valve and the time interval therebetween is easily determined.

Several embodiments of the invention have been described herein. However, many variations can be made without departing from the spirit of the invention. For example, the activator, rather than being a magnetic device, could be a light emitting device which would transmit light through a light transmittable aperture in the chamber separating wall of the housing to a light sensitive activatable member which would provide a signal. Or the activatable member could include a light emitting device which would transmit an optical signal through fiber optics or through a light transmittable aperture in one end of the housing. The invention could also be modified so that the activatable device, rather than a switch type device, could be a solid state circuit designed to produce an electrical field. The activator could be a metallic member which, when moved closer to or farther away from the electrical field, would alter the field to produce an electrical signal to indicate pressure changes in the monitored environment. In other cases the activatable device could be radio-frequency transmitters which would transmit radio-frequency signals in response to changes in monitored environment. The activatable device could include logic circuitry which would perform logic operations prior to transmitting a signal.

The activatable device could be multiple devices which could be activated in predetermined sequences or patterns.

The activating device or activator could be multiple devices, e.g., linearly or radially disposed magnets, capable or activating one or more activatable devices. In any event, it is intended that the scope of the invention be limited only by the claims that follow.

We claim:

1. A remote pressure or vacuum sensing device comprising:

a housing having first and second chambers separated by an internal wall, said first chamber being at all times in true pressure fluid communication with a pressurized or vacuum environment to be monitored;

activator means carried within said first chamber for axial movement therein between a terminal position and other positions in response to fluid communication of true pressure or vacuum conditions of said monitored environment to a portion of said activator means, said activator means comprising an activator attached to a diaphragm member the periphery of which is in sealing engagement with a surrounding portion of said first chamber, one side of said diaphragm being the portion of said activator means in fluid communication with said monitored environment, the opposite side of said diaphragm member being isolated from said monitored environment, said diaphragm member being moveable and responsive to pressure changes in said environment to move said activator to positions nearer to or farther from the portion of said internal wall nearest said activator; and activatable means carried within said second chamber, said activatable means being activated upon movement of said activator to said positions nearer to or farther from said internal wall to provide signals for indicating pressure changes in said monitored environment.

2. A remote pressure or vacuum sensing device as set forth in claim 1 in which said activator is one or more magnetic devices, said activatable means being one or more magnetically activated devices.

3. A remote pressure or vacuum sensing device as set forth in claim 2 in which said housing is provided with a non-chamber penetrating hole adjacent said second chamber into which a magnetic member may be inserted to test activation of said activatable means.

4. A remote pressure or vacuum sensing device as set forth in claim 1 in which said activator is one or more light emitting devices, said activatable means being one or more light activated devices.

5. A remote pressure or vacuum; sensing device as set forth in claim 1 in which said activatable means comprises a light emitting device which responds to movement of said activator means for producing an optical signal to indicate pressure changes in said monitored environment.

6. A remote pressure or vacuum sensing device as set forth in claim 1 in which said activatable means comprises an electrical circuit for generating an electrical field, said activator comprising a metallic member which when moved closer to or farther away from said activatable means by said diaphragm members alters said electrical field, to provide said signals for indicating said pressure changes in said monitored environment.

7. A remote pressure or vacuum sensing device as set forth in claim 1 in which said activatable means comprises a radio-frequency transmitting device which responds to movement of said activator, closer to or farther away from said transmitting device, to provide radio frequency signals for indicating said pressure changes in said monitored environment.

8. A remote pressure or vacuum sensing device as set forth in claim 1 in which said activator means comprises and adjustment member attached to said activator, said adjustment member permitting limited axial adjustment of said activator relative to a central axis of said housing.

9. A remote pressure or vacuum sensing device as set forth in claim 1 including biasing means carried in said first chamber engaging said activator means and biasing said activator means toward said terminal position.

10. A remote pressure or vacuum sensing device as set forth in claim 9 in which said first chamber is cylindrical, said biasing means is a helically wound spring and said housing comprises an annular recess at one end of said first chamber in which one end of said spring is disposed.

11. A remote pressure or vacuum sensing device as set forth in claim 9 in which said first chamber is cylindrical, said biasing means is a spring whose axis is coaxial with a central axis of said first and second chambers, and said housing comprises a cylindrical cavity in which a portion of said spring is disposed.

12. A remote pressure or vacuum sensing device as set forth in claim 1 comprising a first closure member removably engageable with said housing for closing the end of said first chamber opposite said internal wall, said first closure member being provided with an inlet through which said first chamber is in said fluid communication with said monitored environment and by which said portion of said activator means is exposed to said monitored environment.

13. A remote pressure or vacuum sensing device as set forth in claim 12 comprising a second closure member removably engageable with said housing for closing the end of said second chamber opposite said internal wall, disengagement of said second closure member from said housing permitting access to said activatable means.

14. A remote pressure or vacuum sensing device as set forth in claim 13 in which at least one of said closure members is provided with an aperture through which light from said activatable means may be transmitted.

15. A remote pressure or vacuum sensing device as set forth in claim 1 in which said activator is moveable in said first chamber between positions closer to and farther away from said activatable means in said second chamber, upon said movement of said activator means between said terminal and said other positions, said activatable means comprising at least one switching device which is responsive to the position of said activator in said first chamber to provide said signals for indicating said pressure changes in said monitored environment.

16. A remote pressure or vacuum sensing device as set forth in claim 15 in which said activator is a magnetic device and said switching device is a magnetically responsive switch which forms a portion of an electrical circuit comprising a signal device by which said signals indicate pressure changes in said pressurized environment.

17. A remote pressure or vacuum sensing device as set forth in claim 16 in which said activatable means comprises a switch carrying member on which said switching device is carried and which is adjustable within said second chamber for positioning said switching device within said second chamber between positions closer to and farther away from said activator.

18. A remote pressure or vacuum sensing device as set forth in claim 17 in which said activatable means comprises a tubular housing fixedly mounted within said second chamber in coaxial alignment with a central axis of said first and second chambers, said switch carrying member being slidingly carried within said tubular housing for said adjustable positioning between said closer and farther away positions from said activator.

19. A remote pressure or vacuum sensing device as set forth in claim 18 in which said switch carrying member comprises a gear rack engageable with a gear carried by said tubular housing on an axis perpendicular thereto, said gear being rotatable for moving and adjusting said switch carrying member within said second chamber.

20. A remote pressure or vacuum sensing device as set forth in claim 19 including a locking device engaging said tubular housing and by which said tubular housing may be contracted to grip said switch carrying member to selectively prevent movement of said switch carrying member within said housing.

21. A remote pressure or vacuum sensing device as set forth in claim 20 in which said housing is provided with one or more apertures through which said gear and said locking device may be operated.

22. A remote pressure or vacuum sensing device as set forth in claim 18 in which said second chamber and said tubular housing of said activatable means are cylindrical, the interior of said tubular housing and the exterior of said switch carrying member being provided with an elongated guide rail and a cooperative guide groove permitting sliding axial movement of said switch carrying member within said tubular housing but preventing rotation therein.

23. A remote pressure or vacuum sensing device as set forth in claim 15 in which said activatable means comprises an elongated cavity in which said switching device may be disposed.

24. A remote pressure or vacuum sensing device as set forth in claim 23 in which said switching device comprises a terminal strip having a plurality of terminals which, in cooperation with corresponding electrical components and said activator, provide discrete signals to indicate specific pressure changes in said monitored environment.

25. A remote pressure or vacuum sensing device as set forth in claim 23 in which said switching device comprises one or more light emitting diodes (LED), activation and deactivation of which provides said signals for indicating said pressure changes in said monitored environment.

26. A remote pressure or vacuum sensing device as set forth in claim 25 in which an end of said housing closing the end of said second chamber is provided with a light transmittable closure through which light from said one or more LED's may be transmitted.

27. A remote pressure or vacuum sensing device as set forth in claim 1 in which said activatable means is carried by a body member which is removably engageable with said housing for placing said activatable means within said second chamber.

28. A remote pressure or vacuum sensing device as set forth in claim 27 in which said body member engages said housing in an axially adjustable connection, allowing said activatable means to be axially adjusted, relative to said actuator means.

29. A remote pressure or vacuum sensing device as set forth in claim 28 including locking means attached to said body member and said housing, preventing unauthorized adjustment of said activatable means.

30. A remote pressure or vacuum sensing device as set forth in claim 1 in which said activator is attached to said diaphragm by adjustable connection means, said adjustable connection means allowing limited axial adjustment of said activator within said first chamber.

31. A remote pressure or vacuum sensing device as set forth in claim 30 in which said connection means is engageable and adjustable from said one side of said diaphragm without disturbing other components of said device.

32. A remote pressure or vacuum sensing device as set forth in claim 1 in which said activatable means comprises adjustment means by which said activatable means may be axially adjusted within said second chamber to position said activatable means closer to or farther away from said activator means.

33. A remote pressure or vacuum sensing device as set forth in claim 32 in which said housing is provided with one or more apertures through which said adjustment means may be engaged for said axial adjustment of said activatable means.

34. A remote pressure or vacuum sensing device as set forth in claim 33 in which said one or more apertures is provided with a removable closure member.

* * * * *